United States Patent
Aizawa et al.

(10) Patent No.: US 6,805,478 B2
(45) Date of Patent: Oct. 19, 2004

(54) NETWORK TYPE AUTOMATION CONCRETE PLANT

(75) Inventors: Yoshihiro Aizawa, Hokkaido (JP); Akio Itaya, Hokkaido (JP)

(73) Assignee: Aizawa Koatsu Concrete KK, Tomakomai (JP)

( * ) Notice: Subject to any disclaimer, the term of this patent is extended or adjusted under 35 U.S.C. 154(b) by 102 days.

(21) Appl. No.: 10/268,977

(22) Filed: Oct. 11, 2002

(65) Prior Publication Data

US 2004/0071043 A1 Apr. 15, 2004

(51) Int. Cl.⁷ .................................................. B28C 5/00
(52) U.S. Cl. ........................................... 366/1; 700/265
(58) Field of Search .............................. 366/1, 2, 6, 8, 366/16–19, 53, 54; 700/265

(56) References Cited

U.S. PATENT DOCUMENTS

| | | | | |
|---|---|---|---|---|
| 5,713,663 A | * | 2/1998 | Zandberg et al. | 366/17 |
| 6,042,258 A | * | 3/2000 | Hines et al. | 366/8 |
| 6,484,079 B2 | * | 11/2002 | Buckelew et al. | 366/1 |
| 2002/0015354 A1 | * | 2/2002 | Buckelew | 366/2 |

FOREIGN PATENT DOCUMENTS

| | | | |
|---|---|---|---|
| DE | 4211520 A1 | * | 10/1993 |
| JP | 2001-282352 | * | 10/2001 |
| JP | 2003-341413 | * | 12/2003 |

* cited by examiner

Primary Examiner—Charles E. Cooley
(74) Attorney, Agent, or Firm—Armstrong, Kratz, Quintos, Hanson & Brooks, LLP

(57) ABSTRACT

The present invention relates to a network type automated concrete plant for efficiently producing and delivering ready-mixed concrete, and more particularly, to a network type automated concrete plant which can be collectively managed within a group of multiple ready-mixed concrete plants which are distributed and disposed in multiple regions which serve multiple construction sites and are equipped with a ready-mixed concrete producing apparatus, which is capable of realizing efficient operation, management and deployment. In this network type automated concrete plant, multiple ready-mixed concrete plants (20a), (20b) and (20c) are connected to each other through a plant center (10) by way of a network (14). A ready-mixed concrete truck (18) is deployed in each of the ready-mixed concrete plants (20a), (20b) and (20c), however the ready-mixed concrete truck is not fixed to any specific ready-mixed concrete plant, and is operated between a construction site and the closest ready-mixed concrete plant (20a), (20b) and (20c), and is then operated between another construction site and another ready-mixed concrete plant (20a), (20b) and (20c), in accordance with the operational status and requirements. A concrete mixer truck is used as the ready-mixed concrete truck.

4 Claims, 8 Drawing Sheets

NETWORK TYPE AUTOMATION CONCRETE PLANT

BACKGROUND OF THE INVENTION

1. Field of the Invention

The present invention relates to a network type automated concrete plant for efficiently producing and delivering ready-mixed concrete, and more particularly, to a network type automated concrete plant which can be collectively managed within a group of multiple ready-mixed concrete plants which are distributed and disposed in multiple regions which serve multiple construction sites and are equipped with a ready-mixed concrete producing apparatus, which is capable of realizing efficient operation, management and deployment.

2. Description of the Prior Art

In a present day ready-mixed concrete selling, production and distribution business (ready-mixed concrete business), the production, technical and sales management staff are located in a production plant in which a fixed type raw material mixer is mounted, and distribution is carried out by exclusive vehicles (agitator trucks), which are located in each plant and managed by that plant.

In such a business environment, since the concrete production ability is determined by an ability inherent in the fixed mixer, compatibility with respect to variation in surrounding demand is extremely poor. That is, since the supply ability within unit time is constant, if demands shift, supply availability for a user may not be achieved, and if demands are reduced, production equipment may not attain actual ability, creating a problem where the production equipment stands idle.

As one way of solving such a problem, there is a method that utilizes a wet mixing system. When this wet mixing system is utilized, the concrete production plant is not equipped with a fixed type mixer, only with the apparatus for the weighing and measuring of the raw materials. Ready-mixed concrete raw materials such as sand, gravel, cement, water, chemical additives and the like are respectively weighed and measured by such apparatus and then, these raw materials are directly fed into the concrete mixer truck. Then, they are kneaded and mixed within the drum of the concrete mixer truck as it is rotated, thereby producing the ready-mixed concrete. Utilizing this method, it is not necessary to equip the concrete plant with a fixed type of mixer, and so the costs for the production equipment of the concrete plant can be reduced.

According to the method utilizing this wet mixing system, unlike the central mixing method in which production is limited by the ability inherent within the fixed type mixer, the raw materials are kneaded and mixed within the drum of the concrete mixer truck, so if the number of mixer trucks is increased, the production ability of the ready-mixed concrete can be maximized within a range not exceeding the maximum value of the weighing and measuring ability of the raw materials. Further, when demands are reduced, the actual production ability can be minimized by reducing the number of mixer trucks in use, thus it is possible to reduce the chance inherent in existing fixed type mixer plants of production equipment becoming inefficiently utilized.

When the wet mixing system having the above-described merit is utilized, there is a problem in that the operation and management of the concrete production plant and the operation and deployment of the concrete mixer trucks, is not efficiently achieved. Further, when the operation and management of a ready-mixed concrete business in which multiple concrete mixer trucks are dispersed among multiple concrete production plants, the operation and management of the concrete production plants, and the deployment and operation of the concrete mixer trucks becomes so complex, that the equipment can not efficiently be managed.

SUMMARY OF THE INVENTION

The present invention has been accomplished to solve such problems, and it is an object of the invention to provide a network type automated concrete plant for efficiently producing and delivering ready-mixed concrete. It is also an object of the invention to provide a network type automated concrete plant that can be collectively managed within a group of multiple ready-mixed concrete plants which are distributed and disposed in multiple regions which serve multiple construction sites and are equipped with a ready-mixed concrete producing apparatus, which is capable of realizing efficient operation, management and deployment.

To achieve the above object, the present invention provides a network type automated concrete plant, which when grouped in multiples (20a), (20b), (20c) and distributed in multiple regions, can serve multiple construction sites, and the use of multiple ready-mixed concrete trucks (18) for the transportation of ready-mixed concrete, produced in the ready-mixed concrete plants, to those construction sites. It is equipped with a communication means (14) for connecting the multiple ready-mixed concrete plants to the plant center by way of a network, and for the plant center (10), which collectively manages the multiple ready-mixed concrete plants connected by the communication means. The plant center sends a plant control signal to the multiple ready-mixed concrete plants to produce the ready-mixed concrete which is to be transported to the construction sites by the multiple ready-mixed concrete trucks, wherein each of the ready-mixed concrete plants comprises a means for sending/receiving data (15) in which an identifying number for the ready-mixed concrete truck can be input, and sends the identifying number and the plant number, which identifies the ready-mixed concrete plant, to the plant center, and receives a plant control signal from the plant center, and by way of the plant management means(16), controls the ready-mixed concrete producing apparatus by a control signal from the plant center, and from the ready-mixed concrete producing apparatus (17) which stores the concrete raw materials and which is controlled by the plant management means to produce the ready-mixed concrete. The plant center comprises a system management means for sending and receiving data (11) which receives an identifying number of the ready-mixed concrete truck and a plant number, and sends a plant control signal by way of the vehicle management means (12) which identifies the multiple ready-mixed concrete trucks by the identifying number received by the data sending and receiving means, which sends, to the ready-mixed concrete plant of the plant number, a plant control signal for controlling the ready-mixed concrete plant including the composition of the materials for the ready-mixed concrete to be transported by the identified ready-mixed concrete truck, the volume to be transported and details of the destination, and which collectively manages the multiple ready-mixed concrete plants, and the multiple ready-mixed concrete trucks by way of a management means (13), and manages the operational status of the multiple ready-mixed concrete trucks by means of a status signal sent from the ready-mixed concrete trucks.

In the network type automated concrete plant having the above structure, the ready-mixed concrete truck managing means, displays, in a matrix manner, operational schedules of the multiple ready-mixed concrete plants in time series for each ready-mixed concrete plant, and displays, in a color-coded manner, the operational statuses of the plants by means of status signals sent from the multiple ready-mixed concrete trucks which transport the ready-mixed concrete produced in the respective ready-mixed concrete plants, and by the status signals sent from those plants.

In the network type automated concrete plant, according to the invention, the ready-mixed concrete truck managing means comprises a display apparatus for displaying, in a color-coded manner, the status information of the ready-mixed concrete truck, a display processing apparatus which controls the display apparatus and which displays the operational status of the ready-mixed concrete truck and the operational status of the plant, and a receiving apparatus which receives the status information from the ready-mixed concrete truck, the display processing apparatus displays each of the multiple ready-mixed concrete plants in columns of a matrix on a display screen of the display apparatus, and displays a time series operation schedule of each ready-mixed concrete plant in rows of the matrix, and allocates each of the multiple ready-mixed concrete trucks to the operation schedules of the respective ready-mixed concrete plants corresponding to the cells of the matrix, and displays the status information from the ready-mixed concrete truck received from the receiving apparatus in the corresponding cells of the matrix corresponding to the ready-mixed concrete truck in a color-coded manner.

In the network type automated concrete plant, according to the invention, the operational statuses of the ready-mixed concrete trucks are displayed in a color-coded manner in accordance with various states such as plant arrival, shipment approval, shipping, shipment complete, worksite arrival, delivery complete and returning.

The network type automated concrete plant having various features as described above comprises, as a system structure, multiple ready-mixed concrete plants (20*a*), (20*b*), (20*c*), multiple ready-mixed concrete trucks (18), a plant center (10), and a communication means (14) for connecting the multiple ready-mixed concrete plants and the plant center through a network.

The multiple ready-mixed concrete plants (20*a*), (20*b*), (20*c*) are distributed in multiple regions which serve multiple construction sites, contain a ready-mixed concrete producing apparatus. This ready-mixed concrete producing apparatus is not equipped with a fixed type mixer as it utilizes the wet mixing system, and this ready-mixed concrete producing apparatus is equipped with a weighing and measuring means for the stored raw materials. Concrete raw materials such as sand, gravel, cement, water, chemical additive and the like are respectively weighed and measured by the weighing and measuring means and then, the concrete raw materials are directly fed into the mixer truck which is the ready-mixed concrete truck. The ready-mixed concrete final product is completed using the wet mixing technique in which the drum of the concrete mixer truck is rotated at high speed for a given time, after which the ready-mixed concrete is then transported to the construction site.

In this manner, the ready-mixed concrete truck loads the ready-mixed concrete produced by the instructions from the plant center within the multiple ready-mixed concrete plants, and transports the same to the construction sites. The communication means connects the multiple ready-mixed concrete plants and the plant center through a network, so that the plant center collectively manages the multiple ready-mixed concrete plants connected to each other by way of the communication means, and sends a plant control signal to the multiple ready-mixed concrete plants, controls the respective ready-mixed concrete plants, and produces ready-mixed concrete which is transported to the construction sites by the multiple ready-mixed concrete trucks.

In the respective ready-mixed concrete plants, ready-mixed concrete is produced and loaded into the concrete truck. At that time, the identifying number of the ready-mixed concrete truck is input by the data sending/receiving means, the identifying number and a plant number which identifies the ready-mixed concrete plant are then sent to the plant center, and when the plant control signal from the plant center is received, the control means controls the ready-mixed concrete production apparatus by a control signal received from the plant center, so that the ready-mixed concrete is produced from the stored concrete raw materials by the ready-mixed concrete production apparatus.

In the plant center, when the system management means receives the plant number and the identifying number of the ready-mixed concrete truck, the system management means obtains from the plant management means, a plant control signal for producing the ready-mixed concrete which is to be loaded into the ready-mixed concrete truck having this identifying number, and sends the same to the ready-mixed concrete plant having this plant number in accordance with the plant number received.

The generating and sending operation of the plant control signal to each of the ready-mixed concrete plants is collectively managed by the system management means. The system management means identifies the multiple ready-mixed concrete trucks by the identifying numbers received by the data sending/receiving means, and the system management means, sends, to the ready-mixed concrete plant having the plant number, a plant control signal for controlling the ready-mixed concrete plant including instructions such as the composition of raw materials, volume and destination for the ready-mixed concrete to be transported by the identified ready-mixed concrete truck.

In that case, the ready-mixed concrete truck managing means manages the operational status of the multiple ready-mixed concrete trucks by the status signal sent from each ready-mixed concrete truck. The ready-mixed concrete truck is managed by the ready-mixed concrete truck managing means in such a manner that operational schedules for the multiple ready-mixed concrete plants are displayed in a matrix manner, in a time series for each of the ready-mixed concrete plants, and the operational statuses of the plants are displayed in a color-coded manner (FIGS. 4 to 8), by the status signals sent from the multiple ready-mixed concrete trucks which transport the ready-mixed concrete produced in the respective ready-mixed concrete plants.

More specifically, the ready-mixed concrete truck managing means comprises a display apparatus for displaying, in a color-coded manner, the status information of the ready-mixed concrete truck, a display processing apparatus which controls the display apparatus and which displays the operational status of the ready-mixed concrete truck and the operational status of the plant, and a receiving apparatus which receives the status information from the ready-mixed concrete truck. The display processing apparatus displays each of the multiple ready-mixed concrete plants in columns of a matrix on a display screen of the display apparatus, and displays a time series operational schedule for each of the ready-mixed concrete plants in rows of the matrix, and allocates each of the multiple ready-mixed concrete trucks to the operational schedules of the respective ready-mixed concrete plants corresponding to the cells of the matrix, and displays the status information of the ready-mixed concrete truck based on the information received from the receiving apparatus in the corresponding cells of the matrix, corresponding to the ready-mixed concrete truck in a color-coded manner. The operational statuses of the ready-mixed concrete trucks are displayed in the color-coded manner in accordance with statuses such as plant arrival, shipment approval, shipping, shipment completed, worksite arrival, delivery completed and returning.

With this feature, it is possible to easily and reliably view the various phases of the operational statuses of the concrete trucks and of the multiple ready-mixed concrete plants in the plant center, and it is possible to effectively produce and transport the ready-mixed concrete. Further, since the ready-mixed concrete plants dispersed across the multiple regions, which contain multiple construction sites are collectively managed, it is possible to utilize the plants efficiently.

DESCRIPTION OF THE PREFERRED EMBODIMENT

Figure 1:
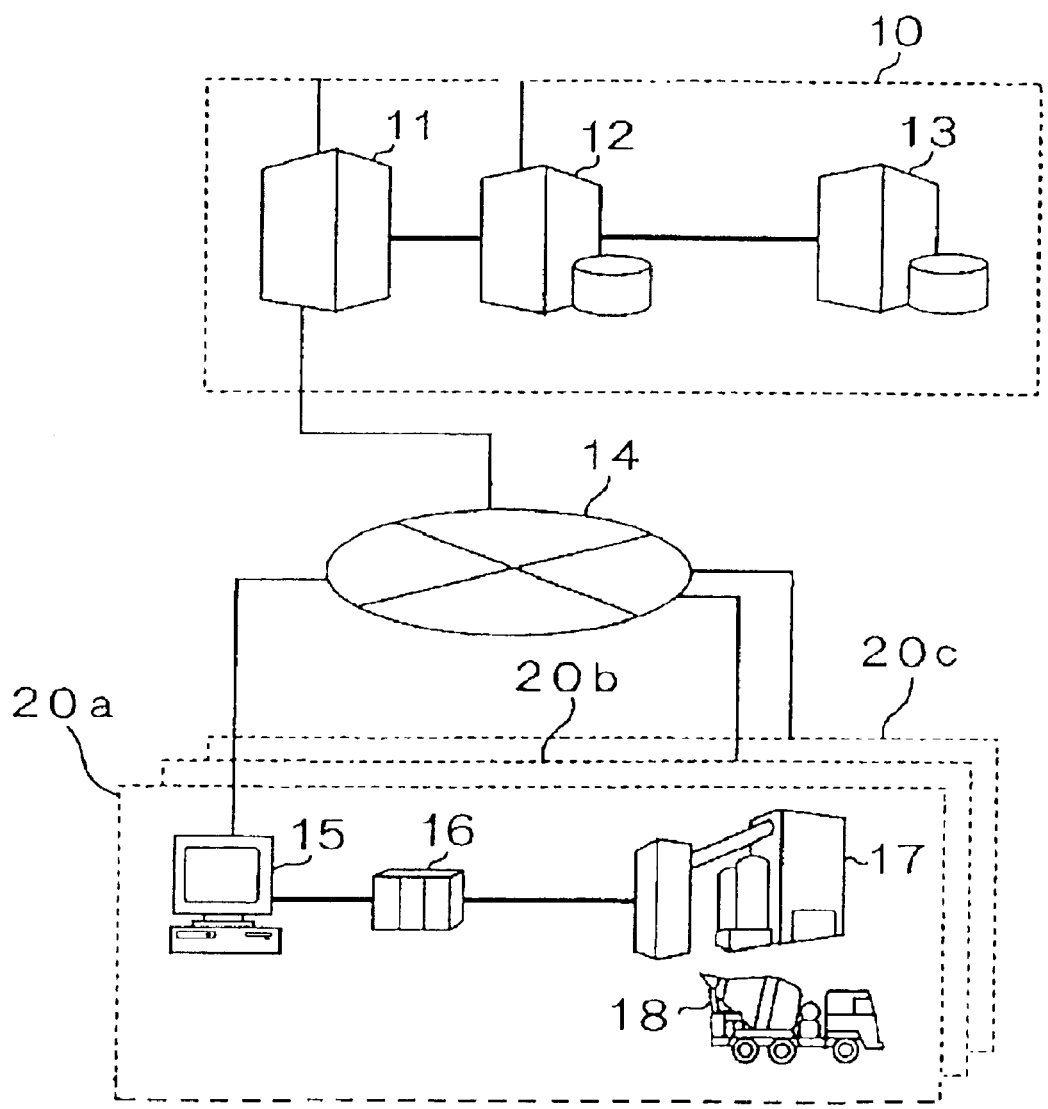
FIG. 1 shows the system structure of the network type automated concrete plant according to an embodiment of the present invention.
Figure 2:
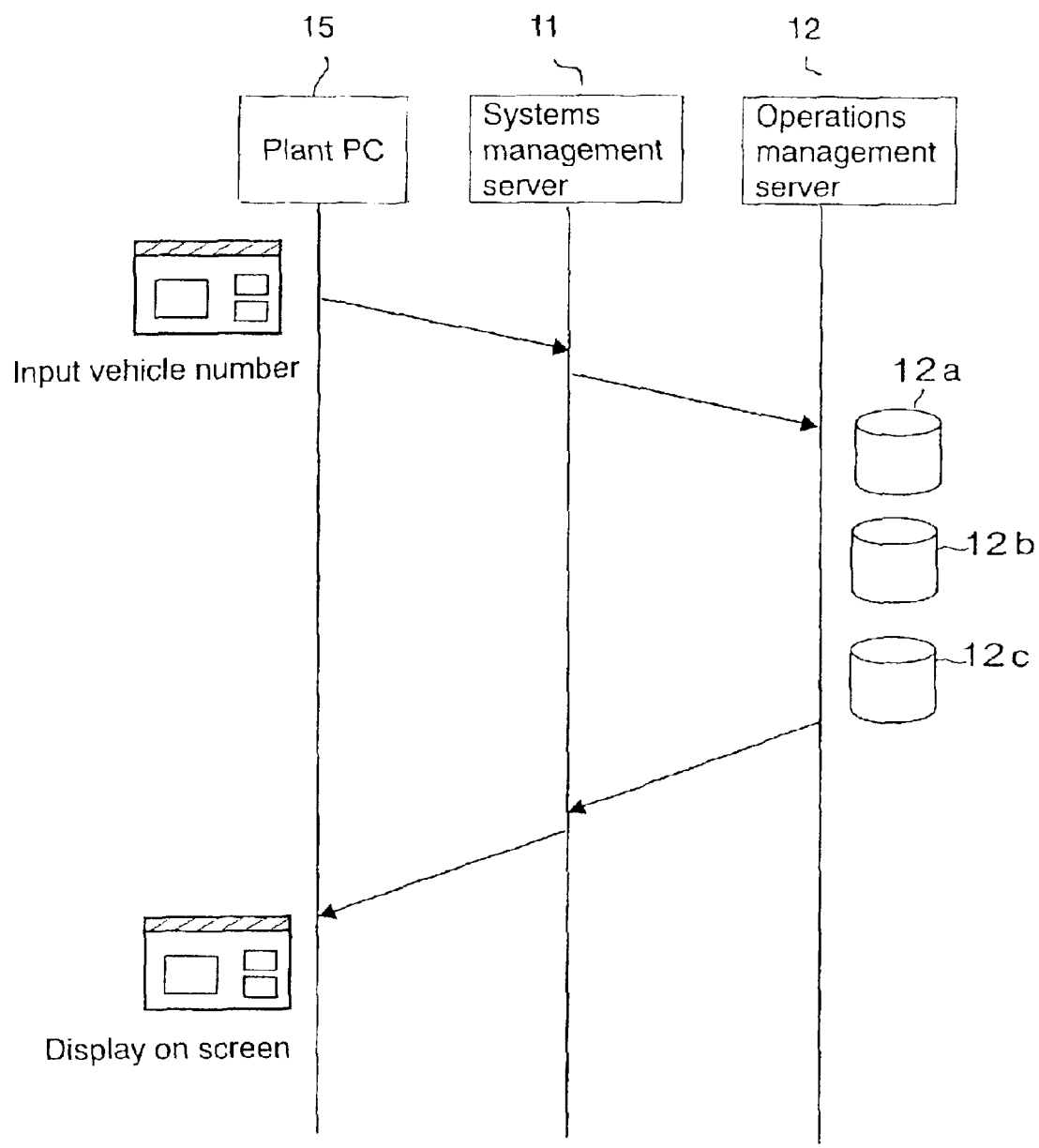
FIG. 2 is a block diagram explaining the initial processing sequence between the plant center and the ready-mixed concrete plant.
Figure 3:
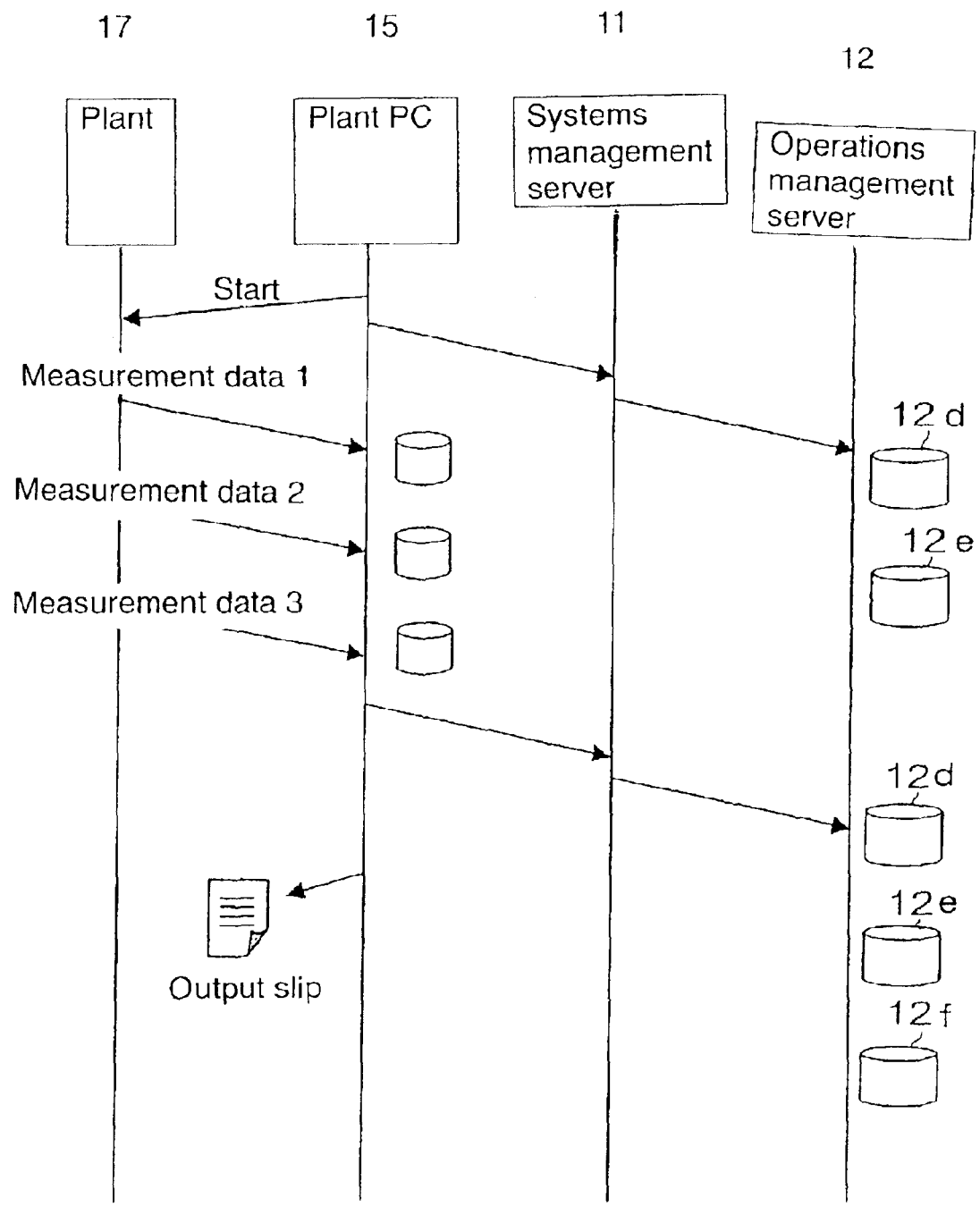
FIG. 3 is a block diagram explaining the subsequent processing sequence between the plant center and the ready-mixed concrete plant.
Figure 4:
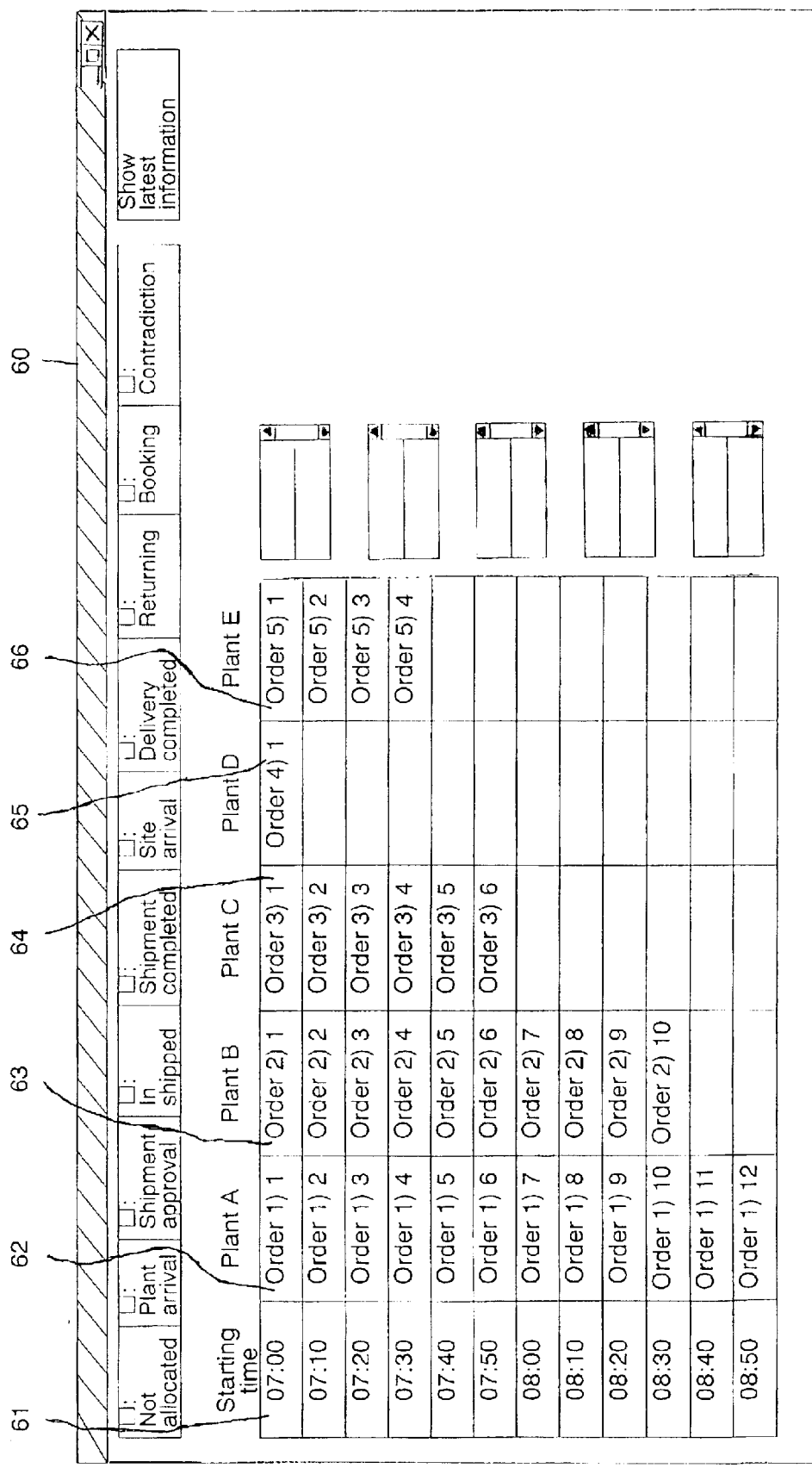
FIG. 4 is a diagram showing, in a matrix manner, an initial example of the display screen that displays the operational statuses of the multiple ready-mixed concrete plants in the plant center and the operational statuses of the multiples of concrete trucks.
Figure 5:
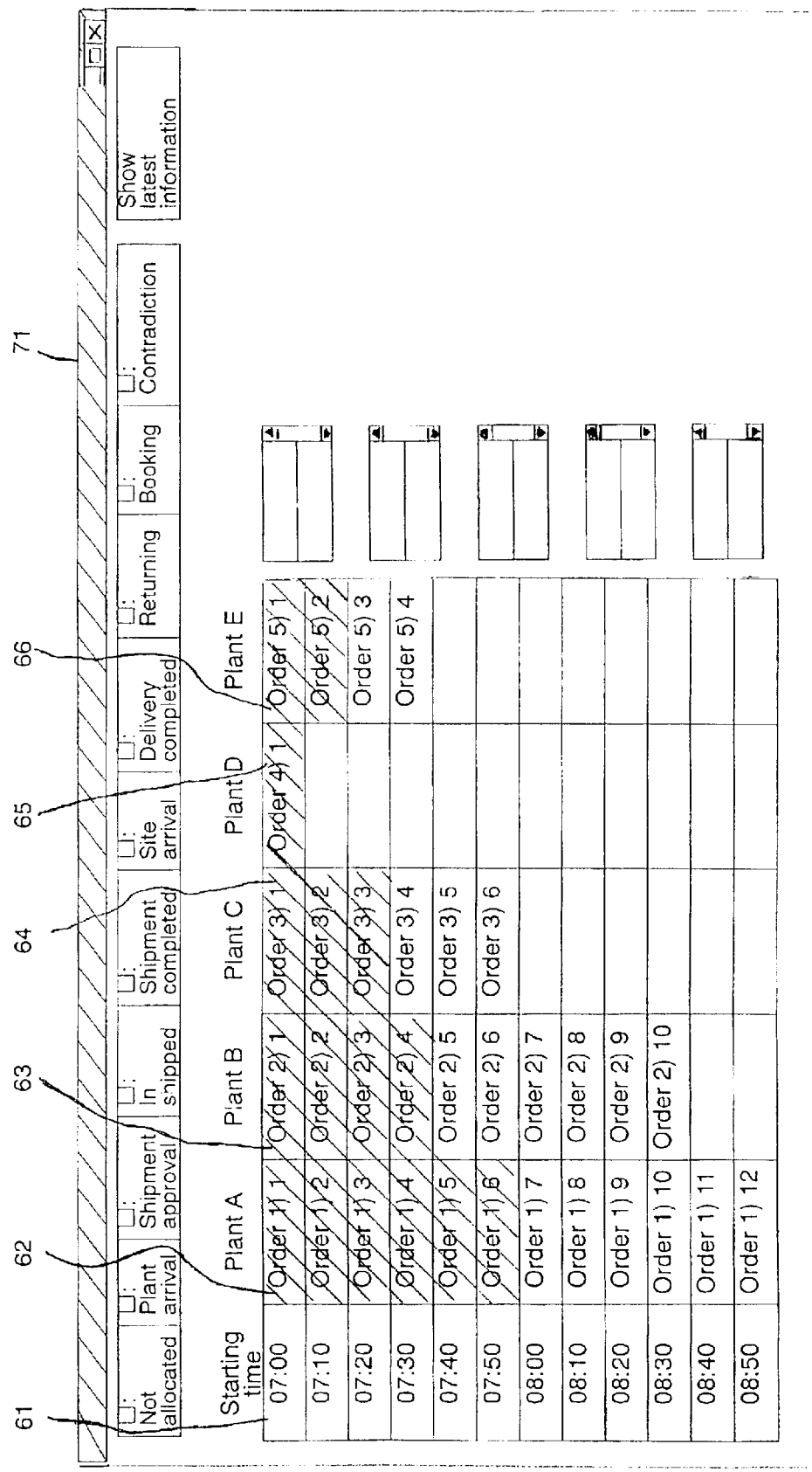
FIG. 5 is a diagram showing, in a matrix manner, a second example of the display screen, which displays the operational statuses of the multiple ready-mixed concrete plants in the plant center and the operational statuses of the multiples of concrete trucks.
Figure 6:
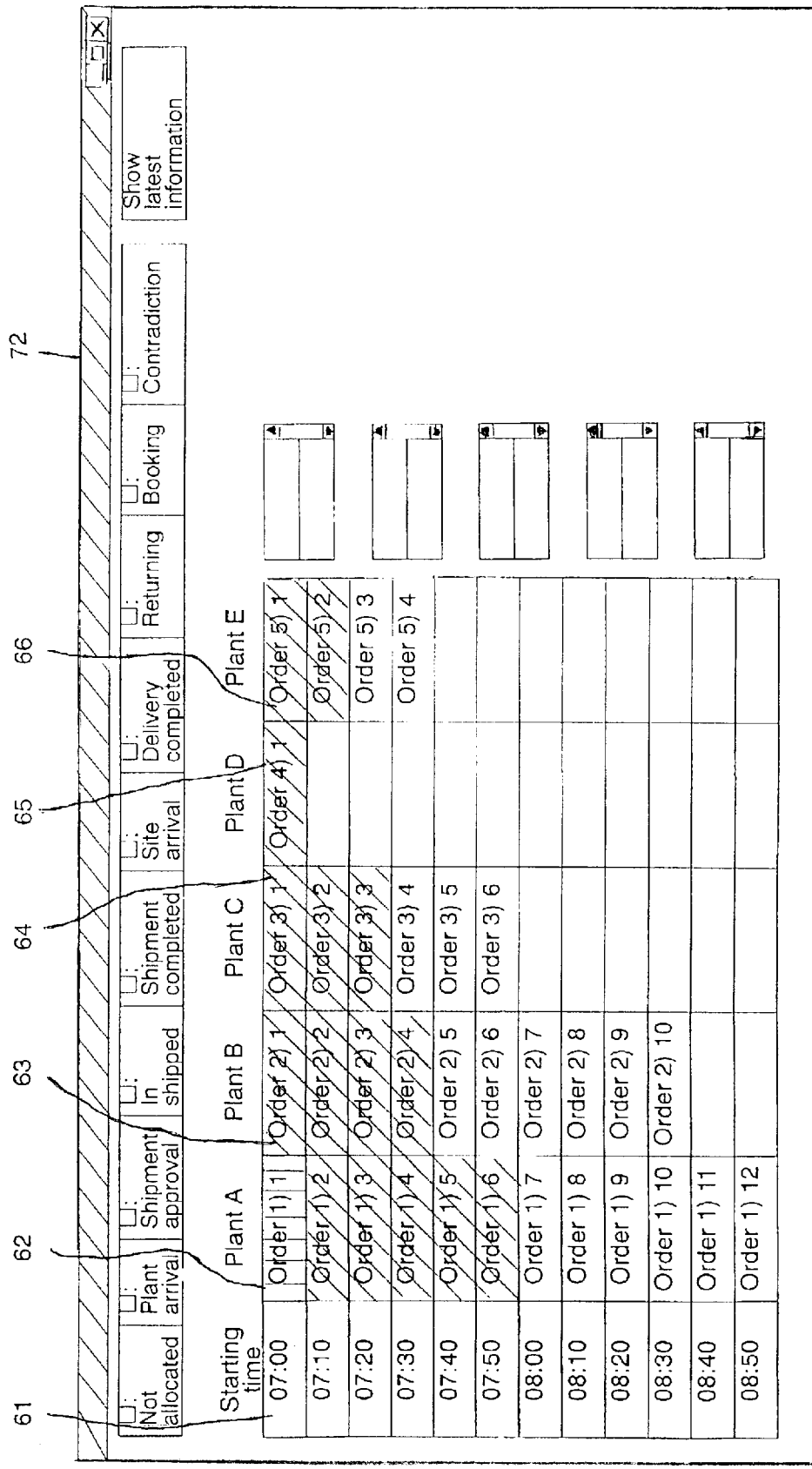
FIG. 6 is a diagram showing, in a matrix manner, a third example of the display screen which displays the operational statuses of the multiple ready-mixed concrete plants in the plant center and the operational statuses of the multiples of concrete trucks.
Figure 7:
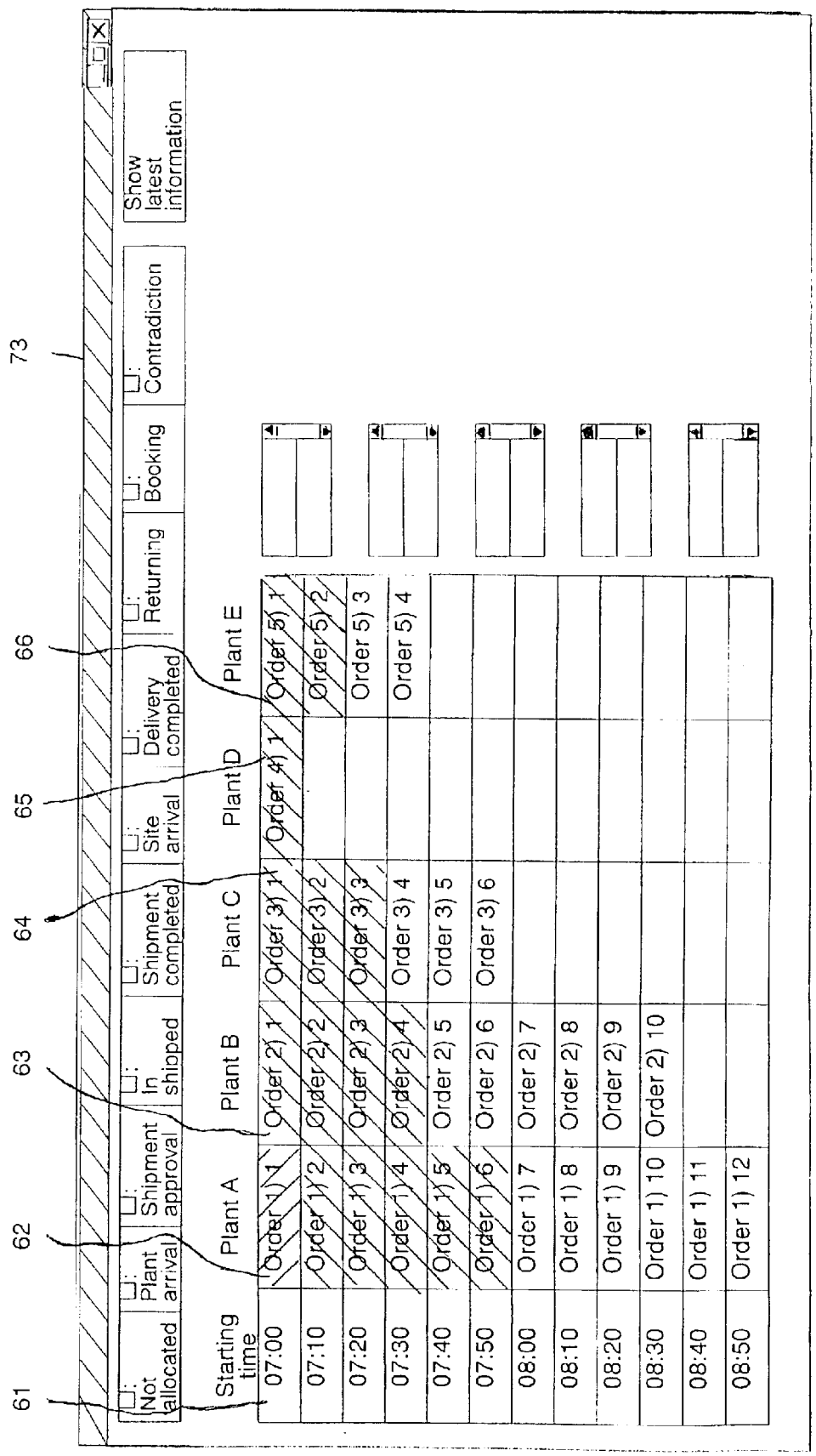
FIG. 7 is a diagram showing, in a matrix manner, a fourth example of the display screen which displays the operational statuses of the multiple ready-mixed concrete plants in the plant center and the operational statuses of the multiples of concrete trucks.
Figure 8:
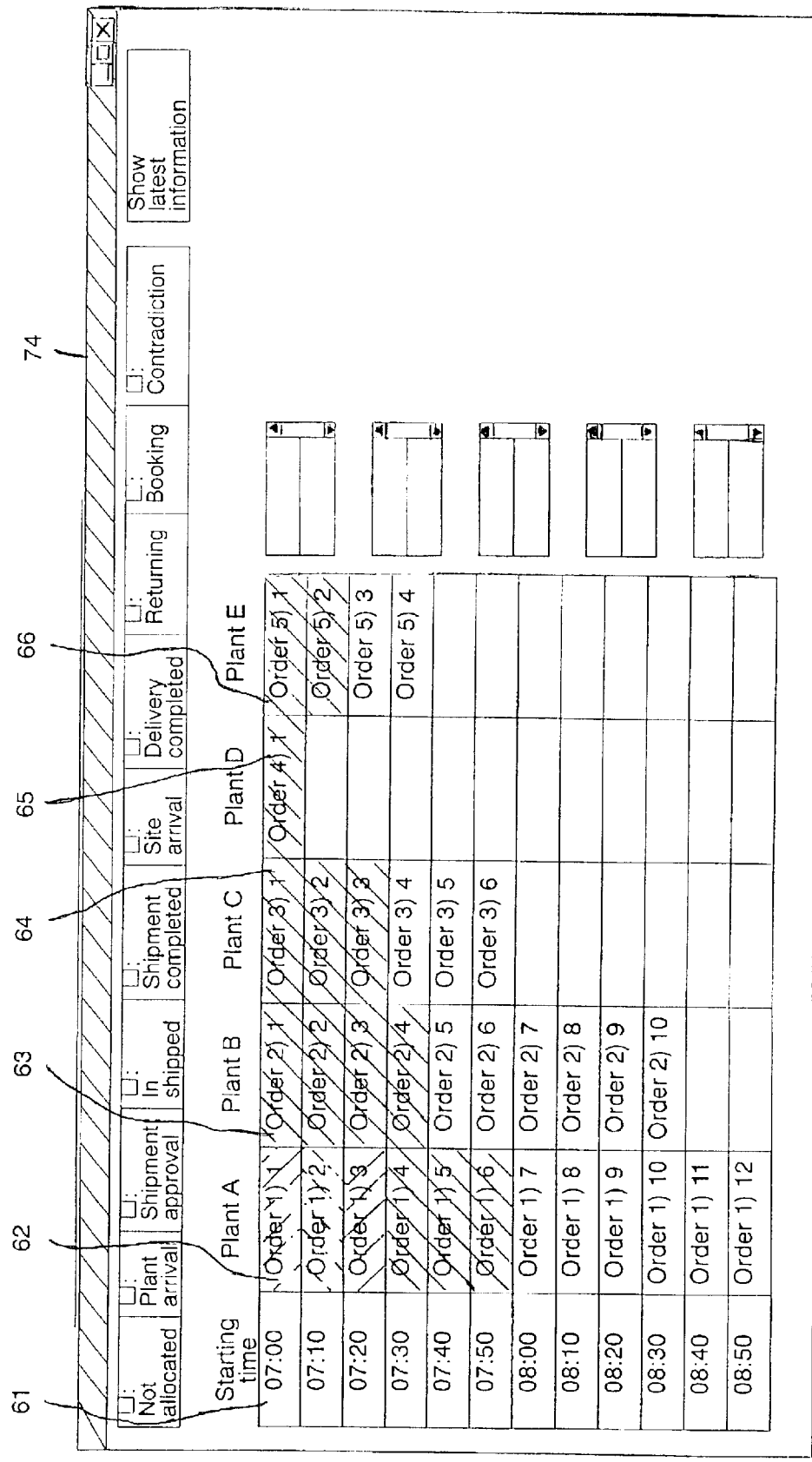
FIG. 8 is a diagram showing, in a matrix manner, a fifth example of the display screen which displays the operational statuses of the multiple ready-mixed concrete plants in the plant center and the operational statuses of the multiples of concrete trucks.

The method for carrying out the present invention will be explained in detail below by way of an example with reference to the drawings. FIG. 1 shows the system structure of the network type automated concrete plant according to the embodiment of the present invention. In FIG. 1, reference number (10) represents the plant center, reference number (11) represents the system management server for carrying out data communication processing between the multiple ready-mixed concrete plants and the plant center to control the ready-mixed concrete plants, reference number (12) represents the operations management server for managing the status of the concrete trucks and the status of the ready-mixed concrete plant, reference number (13) represents the order management system for managing the raw material composition of the ready-mixed concrete to be produced, shipment amount and the like related to the customers, reference number (14) represents a network such as the public network, reference number (15) represents a computer apparatus (plant PC) for processing data communication between the plant center and the ready-mixed concrete plants, reference number (16) represents a programmable logic controller for controlling the ready-mixed concrete producing apparatus, reference number (17) represents the ready-mixed concrete producing apparatus, reference number 18 represents a ready-mixed concrete truck, and reference numbers (20a), (20b) and (20c) represent multiple ready-mixed concrete plants distributed and disposed across multiple regions.

In the network type automated concrete plant, the multiple ready-mixed concrete plants (20a), (20b) and (20c) are connected to each other through the plant center (10) by way of the network (14), utilizing for example frame relay, digital subscriber or dedicated lines. The ready-mixed concrete truck (18) is deployed in each of the ready-mixed concrete plants (20a), (20b) and (20c), but these ready-mixed concrete trucks do not belong to any specific ready-mixed concrete plant, the trucks run between the nearest ready-mixed concrete plant (20a), (20b) or (20c) and the construction site in accordance with instructions from the plant center, or between another ready-mixed concrete plant (20a), (20b) or (20c) and the construction site in accordance with the operational requirements. A concrete mixer truck is used as the ready-mixed concrete truck.

The multiple ready-mixed concrete plants (20a), (20b) and (20c) are distributed and deployed across multiple regions in which there are multiple construction sites. The ready-mixed concrete producing apparatus (17) utilizes the wet mixing system for the production of the ready-mixed concrete, therefore a fixed type mixer is not provided, and only the weighing and measuring apparatus for the raw materials is provided. Concrete raw materials such as sand, gravel, cement, water, chemical additives and the like are respectively weighed or measured by the weighing or measuring apparatus and then, these raw materials are directly fed into the concrete mixer truck. Then, the drum of the concrete mixer truck is rotated at high speed for a specified time to complete the ready-mixed concrete, at which time it is transported to the construction site.

The ready-mixed concrete truck (18) produces and loads ready-mixed concrete in accordance with instructions from the plant center (10) in, for example, the ready-mixed concrete plant (20a), and transports the ready-mixed concrete to the construction site. When the plant center (10) issues such instructions, upon the concrete mixer truck arriving at the ready-mixed concrete plant (20a), the driver of that vehicle inputs an identifying number for the concrete mixer truck using the computer apparatus (15). The computer apparatus (15) sends the identifying number of the concrete mixer truck and the plant number of the ready-mixed concrete plant (20a) to the plant center (10), and waits for the plant control signal to be sent from the plant center.

The instructions for the control of the concrete production apparatus are not stored in the ready-mixed concrete plant (20a), so when the driver of the concrete mixer truck (18)

inputs the identifying number of the concrete mixer truck, this data is sent to the plant center (10) after which the production instructions (plant control signal) for the control of the concrete production apparatus (17) are sent as an electronic signal from the plant center. Therefore, the driver of the concrete mixer truck (18) only inputs the identifying number of his or her own concrete mixer truck into the computer apparatus located in the ready-mixed concrete plant, and then the required concrete raw materials are automatically weighted or measured in according with the planned shipping contents, after which the raw materials are fed into the concrete mixer truck to complete the process. The driver completes the ready-mixed concrete by utilizing the wet mixing technique in which the drum of the concrete mixer truck is rotated at high speed for a specified time, and then transports the completed ready-mixed concrete to the construction site.

In the conventional distribution system for ready-mixed concrete, the concrete mixer truck operates in a route like style in which the ready-mixed concrete is transported from a plant to which the concrete mixer truck is fixed, to the construction site after which the concrete mixer truck returns to the same plant to repeat the process. In accordance with the present invention, the distribution system is remarkably different, in that there is a network of multiple ready-mixed concrete plants. For example, a vehicle which loads ready-mixed concrete at Plant A, transports that ready-mixed concrete to construction site X, after which it travels to plant B, loads ready-mixed concrete and transports it to construction site Y, and then the vehicle can go to a plant C and prepare to transport ready-mixed concrete to construction site X. With this, availability of the vehicle is enhanced, and the unit cost for distributing the ready-mixed concrete can be lowered.

Ready-mixed concrete is produced and loaded into the concrete trucks in each of the ready-mixed concrete plants (20*a*) (20*b*,). The identifying number of the ready-mixed concrete truck is input into the computer apparatus (15) which sends and receives data to and from the plant center (10), and that identifying number and the plant number which identifies the ready-mixed concrete plant are sent to the plant center, upon which it waits for the plant control signal from the plant center (10). When the plant control signal is received it is sent to the programmable logic controller (16). The programmable logic controller (16) controls the ready-mixed concrete production apparatus (17), and the ready-mixed concrete is produced from the stored concrete raw materials by means of the ready-mixed concrete production apparatus (17).

When the system management server (11) receives the identifying number of the ready-mixed concrete truck and the plant number sent from the ready-mixed concrete plant (20*a*) in the plant center (10), the status of the concrete mixer truck is shown as being at the ready-mixed concrete plant (20*a*) and this also registers the identifying number, after which the plant control signal for producing the ready-mixed concrete to be loaded into the concrete mixer truck is retrieved from the operations management server (12) and the order management system (13), and sent to the plant as will be described later.

In the plant center (10), the system management server (11), the operations management server (12) and the order management system (13) are connected to each other by means of a LAN apparatus (not shown) to constitute a network system. Multiple terminal apparatuses operated by administrators are connected to this system. The generation and sending operation of the plant control signals sent to the ready-mixed concrete plants are collectively and completely managed by means of the system including the system management server (11), the operations management server (12) and the order management system (13). The system management server (11) manages the data communication between the plant center and the multiple ready-mixed concrete plants, and also controls the ready-mixed concrete plants. The operations management server (12) manages the statuses of the concrete trucks and the statuses of the ready-mixed concrete plants in-conjunction with the system management server (11). The order management system (13) manages the receiving of orders from the customers, and manages the composition of the raw materials for the ready-mixed concrete to be produced, along with the shipment amount and the like in accordance with the customers.

As described above, in the plant center (10), management of the plant control signal to be sent to the ready-mixed concrete plant is collectively managed, the multiple ready-mixed concrete trucks are respectively identified by their received identifying numbers, and the plant control signal for controlling the ready-mixed concrete plant, which includes the composition of raw materials for the ready-mixed concrete to be transported by the identified respective ready-mixed concrete trucks, as well as the volume of the concrete and instructions for the destination, is sent to the ready-mixed concrete plant (20*a*) which has a specific plant number.

Further, in the plant center (10), the operations management server (12) manages the operational statuses of the multiple ready-mixed concrete trucks based on the status signals sent from those ready-mixed concrete trucks. In the management of the ready-mixed concrete trucks, as shown in FIGS. (4) to (8), operational schedules in the multiple ready-mixed concrete plants (20*a*), (20*b*) and (20*c*) are displayed in a matrix manner in a time series for each respective ready-mixed concrete plant, and the operational statuses provided by the status signals sent from the multiple ready-mixed concrete trucks which transfer the ready-mixed concrete produced in the respective ready-mixed concrete plants, are displayed in color-coded manner, along with the operational statuses of the plants More specifically, the operations management server (12) comprises a display apparatus (not shown) for displaying the status information of the ready-mixed concrete trucks in a color-coded manner, a display processing apparatus (not shown) which controls the display apparatus and displays the operational statuses of the ready-mixed concrete trucks and the operational statuses of the plants, and a receiving apparatus (11) for receiving the status information from the ready-mixed concrete trucks. The display processing apparatus displays each of the multiple ready-mixed concrete plants on a display screen of the display apparatus in columns of the matrix, and displays the time-series operational schedules of the ready-mixed concrete plants in rows of the matrix, each of the ready-mixed concrete trucks is allocated to each of the cells of the matrix in correspondence with the operational schedule of the ready-mixed concrete plant, and displays, in a color-coded manner, the status information from the ready-mixed concrete trucks, received from the receiving apparatus in the cell of the matrix which corresponds to the ready-mixed concrete truck. The operational statuses of the ready-mixed concrete trucks are displayed in a color-coded manner in accordance with various statuses, such as the truck has arrived, shipment is approved, concrete is being shipped, concrete has been shipped, concrete has arrived at worksite, shipment has been completed, and truck is returning.

With this structure, it is possible to easily and reliably grasp the operational statuses of the multiple ready-mixed concrete plants and the various statuses of the concrete trucks, in the plant center, and it is possible to produce and deliver the ready-mixed concrete. Further, since the ready-mixed concrete plants are distributed and disposed in multiple regions, the multiple construction sites can be collectively managed, making it possible to efficiently manage the plants.

An actual example of the process flow for the network type automated concrete plant of the present embodiment will be explained as follows. FIGS. (2) and (3) are diagrams for explaining the processing sequence between the plant center and the ready-mixed concrete plants. FIGS. (4) to (8) are diagrams showing one example of a display screen which displays the operational statuses of the multiple ready-mixed concrete plants in the plant center, and the operational statuses of the multiple concrete trucks, in a matrix manner.

The actual example of the process flow for the network type automated concrete plant will be explained with reference to these drawings. The software system for managing the network type automated plant comprises six subsystems, which are the, order management subsystem, CTI (call center system), customer management subsystem, operations management subsystem, sales management subsystem and system management subsystem.

The management by these software systems is carried out in the following manner. The order management system receives an order by telephone, by facsimile, or through the Internet or from a portable terminal (such as i-mode), and these orders are stored in the main database server. Based on the order information, the operations management system automatically and temporarily produces the shipping schedule (a shipment plan such as delivery destination, time, composition, volume and the like) for the next day. The driver of the concrete mixer truck has an MCA radio and a portable terminal, and an operations manager at the plant center instructs the drivers of their starting plant (a ready-mixed concrete plant at which the drivers should wait) for the next day, by any of the above methods.

Whenever the driver arrives at their instructed ready-mixed concrete plant and inputs, into the plant PC, a vehicle number which is the identifying number for the concrete truck, data (composition data, shipment instruction data, etc) which is contained within the plant control signal from the plant center, is sent by way of the network, to that ready-mixed concrete plant. Thereafter, when the driver pushes the start button, the composition data from the plant control signal is sent to the programmable logic controller, thus activating the ready-mixed concrete production apparatus, the ready-mixed concrete raw materials are weighed or measured and fed into the concrete mixer truck, and the loading operation is completed. When the loading of the concrete raw materials into the concrete mixer truck is completed, the weighed and measured values of the raw materials are recorded, and printed on the delivery note. This shipment completion data (weighed or measured data) is sent to the plant center from the computer apparatus (plant PC) in the plant, and is recorded in the sales management system.

In the ready-mixed concrete business, efficient management becomes possible when the necessary number of concrete mixer trucks can be sent to the closest ready-mixed concrete plant at the required time, appropriately based on the shipment schedule (order table). In the management of the locations of the concrete mixer trucks, it is not so important to keep tracking the current position of each vehicle. For example, it is not necessary to specifically allocate vehicle B to shipment A, so efficient management can be attained if sufficient vehicles are allocated in each plant to satisfy the shipment schedule.

The driver of each concrete mixer truck has a portable terminal, such as i-mode, and the driver uses this device to inform the plant center of the current status of his or her concrete mixer truck (For example, the driver has arrived at the plant, preparing to ship, concrete is being shipped, shipment has been completed, the driver has arrived at the worksite, the driver is returning, etc.) by pushing preset function keys on the portable terminal. In the plant center, the various statuses received are displayed on the screen in a color-coded manner, related to that vehicle.

In detail, when a driver arrives at a plant to which they were assigned the previous day, they push a function key on the portable terminal which indicates "the driver has arrived at the plant", and this information is sent to the plant center via the network. The colors of the shipments displayed in a time series for each plant on the shipping schedule screen of the display apparatus on the network terminal in the plant center, change to a specified color indicating that the driver has arrived at the plant. The basic role of the operations managers in the plant center is to select the least manned plant having the lowest vehicle distribution from the shipping schedule table if the color indicating that the shipment has been completed has been sent from the driver of the concrete mixer truck, and to instruct that driver to return to that plant. The latest operational statuses of all the concrete mixer trucks are identified from the matrix-like display screen of the shipping schedule and shown by means of colors. Therefore, if attention is paid only to the shipping schedule and the vehicle distribution, it is possible to avoid the possibility of a shortage of vehicles occurring, and to collectively manage many vehicles with very few staff.

FIGS. (2) and (3) show the processing sequence between the plant center and the ready-mixed concrete plant described above. The concrete mixer truck arrives at the ready-mixed concrete plant to which it was assigned on the previous day, and the driver of the truck operates the computer apparatus (plant PC) (15) in the ready-mixed concrete plant by inputting their vehicle number as the identifying number for the concrete mixer truck and pushes the send button. Then the shipping data is read from the operations management server (12) through the systems management server (11) in the plant center, and the shipping data is displayed on the screen.

In the processing sequence, when a vehicle number is input and the "vehicle number" button is pushed, the operational data is obtained from a process data management file (12a) in the operations management server (12), and the shipping data for the shipment for that plant is obtained from the "allocation of vehicle to shipping table" master file (12b). When the vehicle number is input, the input is checked, and if the vehicle number comprises of information other than the assigned number, then error processing is carried out. When the numeric value of the vehicle number is input, the driver's name corresponding to that vehicle number is obtained from the "mixer truck to driver relational table", and stored. Using this stored information, for example, an order file (12c) is accessed and the shipping data for accepted orders, which are not yet assigned to other vehicles, is read.

From the vehicle to shipping table, the composition number, volume, order number, arrival time, order quantity, cumulative quantity, pitch, invoice classification, order address and customer's name, are stored in each data record of the driver's instructions, are read and displayed. From the mixer truck to driver relational table, the driver's name is read and displayed. From the process data management file (12a), the data for the process year, month and day is read and displayed.

In the operations management server (12), the status of the vehicle number is displayed as "yellow" during the transport of the shipment, and normal completion is displayed as "blue". Abnormal completion is displayed as "red". When the vehicle number is input, if a corresponding record with that vehicle number information cannot be found, the input vehicle number is defined as an error. An error message is displayed, the driver confirms the error message and then, the vehicle number is input again.

After the shipping data is displayed, the displayed composition number and volume are input. By inputting this composition data, the same numbers as displayed in the shipping data, that is the composition number and volume, are input, allowing the composition number and the volume to be checked. That is, inputting data other than the same numbers shown in the displayed shipping data, namely the composition number and the volume, causes an error. If the input check of the composition number and the volume is normal, the driver is able to operate the "plant start" button.

Next, in the ready-mixed concrete plant shown in FIG. (3), if the input of the "plant start" button is accepted, by the driver operating the computer apparatus (plant PC) (15) of that ready-mixed concrete plant and pushing the "plant start" button, the computer apparatus (plant PC) (15) sends the composition data, volume and vehicle number to the plant (programmable logic controller) (17). The pushing of the "plant start" causes the "shipping instructions" status to be indicated in yellow by the operations management server (12).

In return, the plant (programmable logic controller) (17) sends various status data such as "measuring", "measuring result", "discharging" and "discharging complete" to the plant center. In the case of the "measuring result", the actual measured, or weighed data (measured value) and a display status of "measuring result" are returned. In the case of "measuring", "discharging" and "discharging complete", only display statuses are returned.

Using this returned statuses, the data table is renewed. In the operations management server (12), data such as "status classification", "order number" and "shipment sequence number" of the mixer truck to driver relational table (12d) is updated, and the status data of "status classification", is set to "being shipped". In the mixer truck operational state archive file (12e), "status classification", "date", "time", "order number" and "shipment sequence number" are registered.

The operation of the plant (programmable logic controller) (17), from "measuring" to "discharging complete" is repeated a maximum of three times. Measured data is displayed each time, and when the measurement has been completed, the input of "Print Invoice" button can be activated in the computer apparatus (plant PC) (15). If the "Print Invoice" button is pushed, a printer prints the shipment invoice. The measured data is printed on to the invoice, in the order in which it was measured, and for the vehicle it was measured. When the measurement has been completed, the measured data is registered in measurement data file (12f). This is carried out by storing the measured data obtained by the plant equipment in the operation management database in the operations management server (12). Data for each batch and the total is registered. This data is accumulated in the measurement data file (12f).

At that time, in the operations management server (12), the data of "status classification", "order number" and "shipment sequence number" in the mixer to driver relationship table (12d) is updated. "Shipment has been completed" is set as the state of the "status classification". The "status classification" is also updated in the mixer truck operational state archive file (12e). If the printing has been normally completed, "Invoice output" status is shown in blue. If the printing has been abnormally completed, "invoice output" status is shown in red.

FIGS. (4) to (8) show one example of a display screen that displays multiple ready-mixed concrete plants in the plant center and the operational statuses of multiple concrete trucks in a matrix maimer. As shown in FIGS. (4) to (8), display screens to 60 and 71 to 74 which are controlled and displayed by the operations management server (12), display and manage the operational statuses of multiple ready-mixed concrete plants (plant A, plant B, plant C and plant D), and the operational statuses of multiple concrete trucks in the cells of the matrix in a color-coded manner. That is, the time of the shipping schedule is displayed in the first column 61, and the shipping schedules of multiple ready-mixed concrete plants are displayed in columns 62 to 66 of the matrix. The time-series operational schedules of the ready-mixed concrete plants are displayed as rows of the matrix. The operational schedules of the ready-mixed concrete plants are correspondingly displayed in cells of the matrix, and the multiple ready-mixed concrete trucks are allocated to those respective cells.

FIG. (4) shows a display screen 60, before the ready-mixed concrete trucks are allocated to the shipping schedule (order) to the ready-mixed concrete plants displayed in the respective cells. FIG. (5) shows a display screen 71, in which ready-mixed concrete trucks, which arrived at the respective ready-mixed concrete plants, are allocated to a portion of the shipping schedule (order). The allocated cell si shown in FIG. (5). Display screen 71 shows the allocated cell, which is shown in a color-coded manner. For example, six ready-mixed concrete trucks arrive at the plant A, and the shipping schedule (order 1 to order 6) displayed in each cell, is allocated to each of the six ready-mixed concrete trucks. Four ready-mixed concrete trucks arrive at the plant A, and the shipping schedule (order 1 to order 6) displayed in each cell, is allocated to each of the six ready-mixed concrete trucks. Four ready-mixed concrete trucks arrive at plant B, and the shipping schedule (order 1 to order 4) displayed in each cell, is allocated to each of the four ready-mixed concrete trucks. Similarly, three ready-mixed concrete trucks arrive at plant C, and the shipping schedule (order 1 to order 3) displayed in each cell is allocated to each of the four ready-mixed concrete trucks. One ready-mixed concrete truck arrives at plant D, and the shipping schedule (order 1) displayed in the cell is allocated to that ready-mixed concrete truck.

The operational statuses of the ready-mixed concrete trucks allocated to the shipping schedules of the ready-mixed concrete plants are displayed in the respective cells in a color-coded of each cell. The operational statuses of the ready-mixed concrete trucks are displayed in a color-coded manner in accordance with statuses such as, plant arrival, shipment approval, shipping, completion of shipment, worksite arrival, completion of delivery and returning. The status information received from the ready-mixed concrete truck is displayed in the corresponding cell of the matrix, corresponding to the ready-mixed concrete truck is displayed in the corresponding cell of screen 72 shown in FIG. (6), display screen 73 shown in FIG. (7) and the display screen shown in FIG. (8), show these various statuses such as plant arrival, shipment approval, shipping, completion of shipment, worksite arrival, completion of delivery and returning, in accordance with the status sent from the ready mixed concrete truck allocated to that cell of the shipping schedule.

Other views possible in the display screen for the operational statuses of the ready-mixed concrete truck will be explained.

(1) The shipping schedule prepared up to the previous day is displayed on the screen, and the cells of the matrix are not yet sorted out prior to "departure" in which the mixer trucks are deployed in each plant (display screen 60).

(2) A ready-mixed concrete truck is deployed in each plant, and one or more ready-mixed concrete trucks are allocated to the cells of the shipping schedules (orders). The status of "arrived at plant" is shown (display screen 71).

(3) When the instructions for the shipping to commence are sent, that cell is clicked to select a target shipment. If the shipping OK button is pushed, the procedure returns to the allocation of vehicle instructing screen.

(4) Statuses of "Shipping", "completion of shipment" and the like are displayed in each cell of the display screen with respect to such states which are received from the systems management server (display screens 72, 73 and 74).

(5) Statuses of "shipping", "completion of shipment" and the like are displayed in each cell with respect to such statuses that are received by the driver of the ready-mixed concrete truck (display screens 72, 73 and 74).

What is claimed is:

1. A network type automated concrete plant system comprising a plurality of ready-mixed concrete plants dispersed in a plurality of regions of a construction area having a ready-mixed concrete producing machine, a plurality of ready-mixed concrete trucks for transporting read-mixed concrete produced in said ready-mixed concrete plant to the construction area, communication means for connecting said plurality of ready-mixed concrete plants and a plant center through a network, and the plant center for collectively managing said plurality of ready-mixed concrete plants connected by said communication means, said plant center sending a plant control signal to the plurality of ready-mixed concrete plants to produce ready-mixed concrete to be transported to the construction area by the plurality of ready-mixed concrete trucks, wherein each of the ready-mixed concrete plants comprises data sending/receiving means which inputs an identifying number of the ready-mixed concrete truck, sends the identifying number and a plant number which identifies the ready-mixed concrete plant to said plant center, and receives a plant control signal from said plant center, control means which controls the ready-mixed concrete producing machine by a control signal from said plant center, and the ready-mixed concrete producing machine which accommodates concrete raw material and which is controlled by said control means for producing ready-mixed concrete, said plant center comprises data sending/receiving means which receives an identifying number of said ready-mixed concrete truck and a plant number and sends a plant control signal, plant managing means which identifies the plurality of ready-mixed concrete trucks by the identifying number received by the data sending/receiving means, which sends, to the ready-mixed concrete plant of the plant number, a plant control signal for controlling the ready-mixed concrete plant including composition state of material of the ready-mixed concrete to be transported by the identified ready-mixed concrete truck, inner capacity and instructions of destination, and which collectively manages the plurality of ready-mixed concrete plants, and ready-mixed concrete truck managing means which manages running states of the plurality of ready-mixed concrete trucks by means of state signals sent from the ready-mixed concrete trucks.

2. A network type automated concrete plant system according to claim 1, wherein said ready-mixed concrete truck managing means displays, in a matrix manner, operational schedules of the multiple ready-mixed concrete plants in a time series for each ready-mixed concrete plant, and displays, in a color-coded manner, the running states and operational statuses of the plants by means of state signals sent from the multiple ready-mixed concrete trucks which transport the ready-mixed concrete produced in those respective ready-mixed concrete plants.

3. A network type automated concrete plant system according to claim 1, wherein said ready-mixed concrete truck managing means comprises a display apparatus for displaying, in a color-coded manner, the status information of the ready-mixed concrete trucks, a display processing apparatus which controls said display apparatus and which displays the operational statuses of the ready-mixed concrete trucks and the operational statuses of the plants, and a receiving apparatus which receives the status information from the ready-mixed concrete trucks, said display processing apparatus displays each of the multiple ready-mixed concrete plants in columns of a matrix on a display screen of said display apparatus, and displays in a time series, operational schedules of each ready-mixed concrete plant in rows of the matrix, and allocates each of the multiple ready-mixed concrete trucks to the operational schedules of the respective ready-mixed concrete plants corresponding to the cells of said matrix, and displays the status information from the ready-mixed concrete trucks, received from said receiving apparatus in the corresponding cells of said matrix corresponding to that ready-mixed concrete truck, in a color-coded manner.

4. A network type automated concrete plant system according to claim 3, wherein the operational statuses of said ready-mixed concrete trucks are displayed in the color-coded manner in accordance with various statuses, such as plant arrival, shipment approval, shipping, completion of shipment, worksite arrival, completion of delivery and returning.

* * * * *